US009432368B1

(12) United States Patent
Saxena et al.

(10) Patent No.: US 9,432,368 B1
(45) Date of Patent: Aug. 30, 2016

(54) DOCUMENT DISTRIBUTION AND INTERACTION

(71) Applicant: Adobe Systems Incorporated, San Jose, CA (US)

(72) Inventors: Neha Saxena, New Delhi (IN); Divij Kumar, New Delhi (IN); Aditya Kumar Pandey, New Delhi (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 48 days.

(21) Appl. No.: 14/625,852

(22) Filed: Feb. 19, 2015

(51) Int. Cl.
*G06F 9/00* (2006.01)
*H04L 29/06* (2006.01)
*H04L 9/32* (2006.01)
*G06K 9/00* (2006.01)

(52) U.S. Cl.
CPC ....... *H04L 63/0861* (2013.01); *G06K 9/00617* (2013.01); *H04L 9/3247* (2013.01); *H04L 63/0876* (2013.01); *H04L 2209/24* (2013.01); *H04L 2209/72* (2013.01)

(58) Field of Classification Search
None
See application file for complete search history.

(56) References Cited

U.S. PATENT DOCUMENTS

| | | | |
|---|---|---|---|
| 5,825,880 A | 10/1998 | Sudia et al. |
| 5,910,987 A | 6/1999 | Ginter et al. |
| 6,073,101 A | 6/2000 | Maes |
| 6,091,835 A | 7/2000 | Smithies et al. |
| 6,157,935 A | 12/2000 | Tran et al. |
| 6,240,091 B1 | 5/2001 | Ginzboorg et al. |
| 6,615,234 B1 | 9/2003 | Adamske et al. |
| 6,691,089 B1 | 2/2004 | Su et al. |
| 6,928,421 B2 | 8/2005 | Craig et al. |
| 6,959,382 B1 | 10/2005 | Kinnis et al. |
| 7,581,109 B2 | 8/2009 | De Boursetty et al. |
| 7,694,143 B2 | 4/2010 | Karimisetty et al. |
| 7,779,355 B1 | 8/2010 | Erol et al. |
| 7,895,166 B2 | 2/2011 | Foygel et al. |
| 7,996,367 B2 | 8/2011 | Foygel et al. |
| 7,996,439 B2 | 8/2011 | Foygel et al. |
| 8,126,868 B1 | 2/2012 | Vincent |

(Continued)

OTHER PUBLICATIONS

Simske, Steven J. Dynamic Biometrics: The Case for a Real-Time Solution to the Problem of Access Control, Privacy and Security. 2009 First IEEE International Conference on Biometrics, Identiy and Security. Pub. Date: 2009. http://ieeexplore.ieee.org/stamp/stamp.jsp?tp=&arnumber=5507535.*

(Continued)

*Primary Examiner* — Jeremiah Avery
(74) *Attorney, Agent, or Firm* — Finch & Maloney PLLC (57) ABSTRACT

A document originator establishes rules for authenticating an electronic signature. Such rules may require that any user who wishes to assent to the document terms provide biometric data in the form of an ocular image. In one implementation, such rules, as well as the document itself, are provided to a document recipient. If the document recipient assents to the document, an electronic signature is acquired from the document recipient, along with the required ocular image. The image is acquired using an infrared-enabled camera in the case of an iris image, or a retinal scanner in the case of a retina image. The acquired image can be authenticated by comparison to a trusted reference image, for example which may have been obtained from the document recipient during an initial registration process. If the comparison matches with a sufficiently high degree of confidence, then the electronic signature is considered authentic.

18 Claims, 6 Drawing Sheets

(56) References Cited

U.S. PATENT DOCUMENTS

| | | |
|---|---|---|
| 8,234,494 B1 | 7/2012 | Bansal et al. |
| 8,844,055 B2 | 9/2014 | Follis et al. |
| 8,918,311 B1 | 12/2014 | Johnson et al. |
| 8,930,308 B1 | 1/2015 | Johnson et al. |
| 9,058,515 B1* | 6/2015 | Amtrup ............... H04N 1/387 |
| 2002/0038290 A1 | 3/2002 | Cochran et al. |
| 2002/0095290 A1 | 7/2002 | Kahn et al. |
| 2002/0103656 A1 | 8/2002 | Bahler et al. |
| 2003/0009513 A1 | 1/2003 | Ludwig et al. |
| 2003/0037004 A1 | 2/2003 | Buffum et al. |
| 2003/0074216 A1 | 4/2003 | Salle |
| 2003/0083906 A1 | 5/2003 | Howell et al. |
| 2003/0154083 A1 | 8/2003 | Kobylevsky et al. |
| 2003/0187671 A1 | 10/2003 | Kumhyr et al. |
| 2003/0217275 A1 | 11/2003 | Bentley et al. |
| 2004/0102959 A1 | 5/2004 | Estrin |
| 2004/0139344 A1 | 7/2004 | Maurer |
| 2004/0167847 A1 | 8/2004 | Nathan |
| 2004/0204939 A1 | 10/2004 | Liu et al. |
| 2004/0225887 A1 | 11/2004 | O'Neil et al. |
| 2004/0243811 A1 | 12/2004 | Frisch et al. |
| 2004/0264652 A1 | 12/2004 | Erhart et al. |
| 2005/0228999 A1 | 10/2005 | Jerdonek et al. |
| 2005/0289345 A1 | 12/2005 | Haas et al. |
| 2006/0020460 A1 | 1/2006 | Itou |
| 2006/0041828 A1 | 2/2006 | King et al. |
| 2006/0110011 A1* | 5/2006 | Cohen ............... G06F 21/121 382/115 |
| 2006/0143462 A1 | 6/2006 | Jacobs |
| 2006/0157559 A1* | 7/2006 | Levy ............... G06K 17/00 235/380 |
| 2006/0212813 A1 | 9/2006 | Yalovsky et al. |
| 2006/0253324 A1 | 11/2006 | Miller |
| 2007/0055517 A1 | 3/2007 | Spector |
| 2007/0124507 A1 | 5/2007 | Gurram et al. |
| 2007/0143398 A1 | 6/2007 | Graham |
| 2007/0220614 A1* | 9/2007 | Ellis ............... G06F 21/6245 726/27 |
| 2007/0226511 A1 | 9/2007 | Wei et al. |
| 2008/0015883 A1 | 1/2008 | Hermann |
| 2008/0177550 A1 | 7/2008 | Mumm et al. |
| 2008/0180213 A1 | 7/2008 | Flax |
| 2008/0195389 A1 | 8/2008 | Zhang et al. |
| 2009/0062944 A1 | 3/2009 | Wood et al. |
| 2009/0116703 A1 | 5/2009 | Schultz |
| 2009/0117879 A1 | 5/2009 | Pawar et al. |
| 2009/0177300 A1 | 7/2009 | Lee |
| 2009/0222269 A1 | 9/2009 | Mori |
| 2009/0254345 A1 | 10/2009 | Fleizach et al. |
| 2009/0260060 A1 | 10/2009 | Smith et al. |
| 2009/0327735 A1 | 12/2009 | Feng et al. |
| 2010/0161993 A1 | 6/2010 | Mayer |
| 2010/0281254 A1 | 11/2010 | Carro |
| 2010/0306670 A1 | 12/2010 | Quinn et al. |
| 2011/0022940 A1 | 1/2011 | King et al. |
| 2011/0047385 A1 | 2/2011 | Kleinberg |
| 2011/0212717 A1* | 9/2011 | Rhoads ............ G06F 17/30241 455/420 |
| 2011/0225485 A1 | 9/2011 | Schnitt |
| 2012/0072837 A1 | 3/2012 | Triola |
| 2012/0254332 A1 | 10/2012 | Irvin |
| 2013/0046645 A1 | 2/2013 | Grigg et al. |
| 2013/0089300 A1 | 4/2013 | Soundararajan et al. |
| 2013/0103723 A1 | 4/2013 | Hori |
| 2013/0132091 A1 | 5/2013 | Skerpac |
| 2013/0166915 A1 | 6/2013 | Desai et al. |
| 2013/0179171 A1 | 7/2013 | Howes |
| 2013/0182002 A1 | 7/2013 | Macciola et al. |
| 2013/0191287 A1 | 7/2013 | Gainer et al. |
| 2013/0269013 A1 | 10/2013 | Parry et al. |
| 2013/0283189 A1 | 10/2013 | Basso et al. |
| 2013/0339358 A1 | 12/2013 | Huibers et al. |
| 2014/0019761 A1 | 1/2014 | Shapiro |
| 2014/0078544 A1 | 3/2014 | Motoyama et al. |
| 2014/0079297 A1* | 3/2014 | Tadayon ............... G06K 9/00 382/118 |
| 2014/0236978 A1 | 8/2014 | King et al. |
| 2014/0294302 A1 | 10/2014 | King et al. |
| 2014/0343943 A1 | 11/2014 | Al-Telmissani |
| 2014/0365281 A1 | 12/2014 | Onischuk |
| 2014/0372115 A1 | 12/2014 | LeBeau et al. |
| 2015/0012417 A1 | 1/2015 | Joao et al. |
| 2015/0016661 A1 | 1/2015 | Lord |
| 2015/0063714 A1 | 3/2015 | King et al. |
| 2015/0100578 A1 | 4/2015 | Rosen et al. |
| 2015/0172058 A1 | 6/2015 | Follis |
| 2016/0078869 A1 | 3/2016 | Syrdal et al. |

OTHER PUBLICATIONS

Maeder, Anthony; Fookes, Clinton; Sridharan, Sridha. Gaze Based User Authentication for Personal Computer Applications. Proceedings of 2004 International Symposium on Intelligent Multimedia, Video and Speech Processing. Pub. Date: 2004. http://ieeexplore.ieee.org/stamp/stamp.jsp?tp=&arnumber=1434167.*

Craig Le Clair, "What to Look for in E-Signature Providers" (Nov. 15, 2011). Available at https://www.echosign.adobe.com/content/dam/echosign/docs/pdfs/Forrester_What_To_Look_For_In_E-Signature_Providers_Nov_2011.pdf.

U.S. Appl. No. 14/069,674, filed Nov. 1, 2013.
U.S. Appl. No. 14/534,583, filed Nov. 6, 2014.
U.S. Appl. No. 14/551,560, filed Nov. 24, 2014.

EchoSign Jan. 2015 Release, retrieved from <https://www.echosign.adobe.com/content/dam/echosign/docs/pdfs/AdobeES_JanuaryRelease_WhatsNew.pdf> on Aug. 24, 2015.

* cited by examiner

Document (510)

contribute to identity theft. Personal information such as social security numbers, bank account numbers, or credit card numbers (other than a check or credit card authorization form PTO-2038 submitted for payment purposes) is never required by the USPTO to support a petition or an application. If this type of personal information is included in documents submitted to the USPTO, petitioners/applicants should consider redacting such personal information from the documents before submitting them to the USPTO. Petitioner/applicant is advised that the record of a patent application is available to the public after publication of the application (unless a non-publication request in compliance with 37 CFR 1.213(a) is made in the application) or issuance of a patent. Furthermore, the record from an abandoned application may also be available to the public if the application is referenced in a published application or an issued patent (see 37 CFR 1.14). Checks and credit card authorization forms PTO-2038 submitted for payment purposes are not retained in the application file and therefore are not publicly available.

LEGAL NAME OF INVENTOR

Inventor: Mike Sharperson

Signature: Mike Sharperson     Date (Optional):

Authenticated Signatory's Ocular Snapshot (514)

Authenticated Signatory's Name (512)

Note: An application data sheet (PTO/SB/14 or equivalent), including naming the entire inventive entity, must accompany this form or must have been previously filed. Use an additional PTO/AIA/01 form for each additional inventor.

This collection of information is required by 35 U.S.C. 115 and 37 CFR 1.63. The information is required to obtain or retain a benefit by the public which is to file (and by the USPTO to process) an application. Confidentiality is governed by 35 U.S.C. 122 and 37 CFR 1.11 and 1.14. This collection is estimated to take 1 minute to complete, including gathering, preparing, and submitting the completed application form to the USPTO. Time will vary depending upon the individual case. Any comments on the amount of time you require to complete this form and/or suggestions for reducing this burden, should be sent to the Chief Information Officer, U.S. Patent and Trademark Office, U.S. Department of Commerce, P.O. Box 1450, Alexandria, VA 22313-1450. DO NOT SEND FEES OR COMPLETED FORMS TO THIS ADDRESS. SEND TO: Commissioner for Patents, P.O. Box 1450, Alexandria, VA 22313-1450.

*If you need assistance in completing the form, call 1-800-PTO-9199 and select option 2.*

DOCUMENT DISTRIBUTION AND INTERACTION

FIELD OF THE INVENTION

This disclosure relates generally to document processing workflows, and more specifically to workflows that allow documents and/or events to be authenticated using biometric data.

BACKGROUND

Computers and electronic documents have become an increasingly indispensable part of modern life. In particular, as virtual storage containers for binary data, electronic documents have gained acceptance not only as a convenient replacement for conventional paper documents, but also as a useful way to store a wide variety of digital assets such as webpages, sound recordings, and videos. The increased use of electronic documents has resulted in the adaptation of conventional paper-based document processing workflows to the electronic realm. One such adaptation has been the increased use and acceptance of electronic signatures on agreements, contracts, and other documents. When negotiating parties reach an agreement with respect to a course of action, state of affairs, or other subject matter, the resulting agreement is usually reduced to writing and executed by the parties as a way to memorialize the terms of the agreement. Traditionally, a physical copy of the agreement was executed with a personalized stamp, seal, or handwritten signature. However, since this "reduction to writing" now often takes the form of an electronic document stored on a computer readable medium, electronic signatures have become commonplace and have indeed gained widespread legal recognition. See, for example, the Electronic Signatures in Global and National (ESIGN) Commerce Act, 15 U.S.C. §96. Even where an agreement is never actually reduced to writing, the resulting "oral contract" may still be enforceable if evidentiary questions as to the substance of the underlying agreement can be resolved. The wide variety of different formats and legal requirements relating to agreements has resulted in a correspondingly wide variety of workflows—both conventional and electronic—that facilitate the negotiation, formation, execution, fulfillment, and management of agreements, contracts, and other documents.

DETAILED DESCRIPTION

While many efficiencies and benefits have been derived from the implementation of workflows based on electronic signatures, such workflows still suffer from a number of shortcomings and disadvantages. For example, many existing electronic signature systems require a user to generate a graphical representation of his/her signature using a stylus, mouse, touch sensitive surface, or other digital pointing device. Digital pointing devices such as these tend to generate only a rough representation of a person's signature that cannot be authenticated with the same degree of confidence as a conventional pen-and-paper signature. Such processes can also be awkward and cumbersome, especially when implemented using portable devices such as smartphones and tablet computers where a pointing device may be unavailable, and/or where only a limited touchscreen area is available for drawing a signature. While some of these shortcomings have been addressed by systems that insert either an audiovisual or graphical representation of a signature into a document, this gives rise to a host of other concerns, particularly relating to fraud prevention. For instance, in such systems it can be difficult to establish that the inserted signature was actually inserted or authorized by the intended signatory since, in many cases, the inserted signature may not even be unique to the signatory. Moreover, it is widely recognized that the security of existing identity- and knowledge-based authentication solutions can be compromised when accounts are hacked because of weak or leaked passwords, or when social research reveals trusted knowledge. Yet another way of applying an electronic signature to a document is to select a signature from a predefined list of electronic signatures. However, the predefined list can be compromised if the account is hacked and thus the same drawbacks associated with other approaches apply here as well. These disadvantages represent substantial obstacles to the further deployment of electronic signature workflows, especially given the substantial problems that can arise when the authenticity of a signature is suspect. For example, if the authenticity of a signature on a contract is questionable, a party to the contract may later suggest that the signature is illegitimate and attempt to renege on the contract.

Thus, and in accordance with certain of the embodiments disclosed herein, improved document processing workflows allow documents and/or events to be authenticated using biometric data. For example, in one embodiment the originator of an electronic document establishes rules for authenticating an electronic signature or some other expression of assent that is provided in conjunction with the electronic document. Such rules may require that, for instance, any user who wishes to assent to the terms of the electronic document provide biometric data in the form of a scanned image of his/her iris or retina, a fingerprint, a facial pattern, or a voiceprint. In one implementation, one or more of such rules, as well as the document itself, are provided to a document recipient. If the document recipient assents to the document, an electronic signature or other expression of assent is acquired from the document recipient, along with the required iris or retina image. The image is acquired using an infrared-enabled camera in the case of an iris image, or a retinal scanner in the case of a retina image. Location and/or timestamp information that defines or approximates a location and/or time, respectively, associated with the acquired biometric data is also optionally recorded. The acquired image can be authenticated by comparison to a trusted reference image, for example which may have been obtained from the document recipient during an initial registration process. If the comparison matches with a sufficiently high degree of confidence, then the electronic signature or other expression of assent can be considered authentic and legally binding. An encrypted version of the authenticated image or its derivative is optionally incorporated into the electronic document itself as an attachment. In such case the encrypted authenticated image or its derivative can be understood as forming part of the electronic signature itself. In one embodiment, a digital key derived or issued in lieu of the authenticated ocular image is used to digitally sign the electronic document, and the digital signature is incorporated into the electronic document as an attachment. Numerous alternative configurations and modifications will be apparent in light of this disclosure.

Certain of the embodiments disclosed herein are not only easier to use than existing systems that rely on a graphical or audiovisual representation of a signature, but they also result in a signature that can be authenticated with a higher degree of confidence and that is more difficult to repudiate. For example, in the context of iris recognition, because infrared-enabled cameras are becoming ubiquitous on modern portable computing devices, electronic signatures can be authenticated easily without the need for specialized hardware. Moreover, use of iris or retina recognition technology allows an electronic signature to be authenticated with a higher degree of confidence as compared to, for example, handwriting analysis. This makes it more difficult for a signatory to repudiate the signature, and likewise, makes it more difficult to someone to impersonate the signatory. It also results in an electronic signature that is supported by a more robust audit trail. Furthermore, because the appearance of a person's iris and retina tends to be relatively static over a period of many years, certain of the embodiments disclosed herein provide additional stability in long-term applications as compared to voiceprint, handwriting, and fingerprint solutions, all of which have a tendency to vary over long periods of time. Ocular recognition technology also makes certain workflows more accessible to users with physical disabilities that make it difficult to write.

As used herein, the term "document" refers, in addition to its ordinary meaning, to any collection of information that can be communicated between users of the various systems disclosed herein. As used herein, the term "document terms" refers, in addition to its ordinary meaning, to content provided within, or accessible via, a document. A document can take the form of a physical object, such as one or more papers containing printed information, or in the case of an "electronic document", a computer readable medium containing digital data. Electronic documents can be rendered in a variety of different ways such as via display on a screen, by printing using an output device, or aurally using an audio player and/or text-to-speech software. Thus, it will be appreciated that electronic documents may include digital assets in addition to or instead of text; such digital assets may include, for example, audio clips, video clips, photographs, and other multimedia assets. Documents may encompass a virtually unlimited range of subject matter, including documents that contain terms that are to be agreed to amongst various participants in a given workflow. Examples of such documents include agreements, settlements, and legally binding contracts. For instance, both a word processing file containing the terms of a legally enforceable contract as well as a compressed audio file containing an audio recording of the same contract terms would both be considered "documents" for the purposes of this disclosure. Such textual and audio components may be combined into a single "document" in certain embodiments. Documents may be communicated amongst users by a variety of techniques ranging from physically moving papers containing printed matter to wired and/or wireless transmission of digital data.

As used herein, the term "document originator" (or "originator") refers, in addition to its ordinary meaning, to a user or entity that represents the source of a document in a workflow. Likewise, the term "document recipient" (or "recipient"), refers, in addition to its ordinary meaning, to a user or entity that represents the target of a document in a workflow. Thus, in a generalized workflow, a document originator can be understood as sending a document to a document recipient. It will be appreciated that a document originator may not necessarily be the creator, author, or generator of a particular document, but rather may simply be a user or entity that initiates a workflow by sending a document to a recipient. Likewise, the document recipient may not be the ultimate recipient of a document, particularly where a document is routed amongst multiple users in a given workflow. Thus, a single user or entity may act as both a document originator and a document recipient in different contexts. It will also be appreciated that the terms document originator and document recipient are not limited to people or users, but may also refer to entities, organizations, workstations, or computing devices which originate or receive documents as part of a workflow. Finally, a given workflow may not necessarily involve the document itself being transmitted from document originator to document recipient; in some cases other data relating to a document, such as metadata and/or a network address, may be transmitted between a document originator and a document recipient.

As used herein, the term "electronic signature" refers, in addition to its ordinary meaning, to data that can be attached to or logically associated with an electronic document. Thus an electronic signature may comprise, for example, a string of characters, a digital key, a bitmap image such as an image of a handwritten signature, an audio and/or visual recording of a person reciting a spoken phrase such as "I agree to these terms", a visual recording of a person performing a sequence of physical gestures, biometric data, or any suitable combination of the foregoing. Electronic signatures may or may not be encrypted or otherwise encoded in a way that limits access and/or modification by unauthorized parties. An electronic signature may be personalized and associated with a particular individual, such as in the case of an electronic signature that includes or is authenticated with biometric data. An electronic signature may additionally or alternatively be generated automatically in response to a specified user input, such as the selection of an electronic checkbox, the clicking of a button in a graphical user interface, or the generation of a touchtone using a telephone keypad. It will be appreciated that an electronic signature need not necessarily be incorporated into a particular electronic document, but may simply be stored in a resource managed by, for example, an electronic signature server, which can then create a logical association between the electronic signature and the electronic document. Where an electronic signature is encoded using binary digits, it may also be referred to as a "digital signature". In some implementations an electronic signature is generated using binary digits of the electronic document being signed. One example of a product which provides services associated with an electronic signature server is Adobe EchoSign (Adobe Systems Incorporated, San Jose, Calif.). An electronic signature is one manifestation of assent to the terms of a document.

System Architecture

Figure 1:
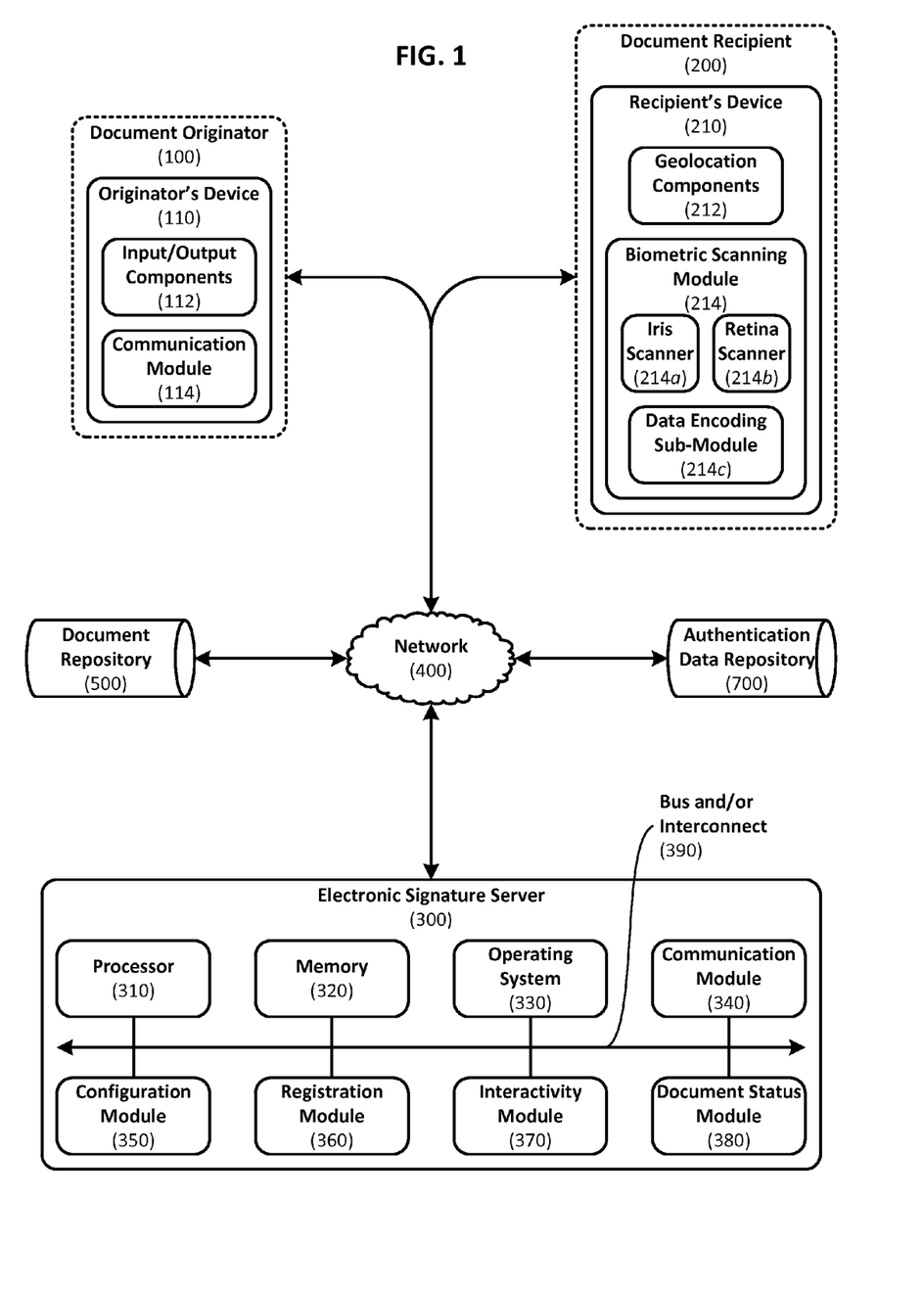
FIG. 1 is a block diagram illustrating selected components of an example computer system that allows documents and/or events to be authenticated using biometric data.

FIG. 1 is a block diagram illustrating selected components of an example computer system that allows documents and/or events to be authenticated using biometric data. More specifically, the computer system illustrated in FIG. 1 can be understood as enabling a document originator 100 and a document recipient 200 to interact with each other in a document processing workflow that is managed by an electronic signature server 300. In such embodiments, document originator 100, document recipient 200, and electronic signature server 300 can communicate with each other via a network 400. Network 400 can also be used to access supplementary resources such as a document repository 500 and an authentication data repository 700, although additional or alternative resources may be provided in other embodiments. In some cases one or more of such resources are integrated into and provided by one or more of document originator 100, document recipient 200, or electronic signature server 300, as will be described in turn. Thus other embodiments may have fewer or more networked resources depending on the granularity of implementation. It will therefore be appreciated that the various embodiments disclosed herein are not limited to provision or exclusion of any particular resources.

As illustrated in FIG. 1, document originator 100 has access to a device 110 that enables document originator 100 to interact with other users and/or other components of the various systems that are illustrated in FIG. 1 and/or described herein. For example, device 110 may comprise one or more of a variety of suitable computing devices, including devices such as handheld computers, cellular telephones, tablet computers, smartphones, laptop computers, desktop computers, and set-top boxes. Other devices or combinations of devices may be used in other embodiments. In one implementation, device 110 includes input/output components 112 such as one or more of a keyboard, a touch sensitive display, a pointing device, and/or any other suitable input/output device. Device 110 also optionally includes a wired and/or wireless communication module 114 that enables communication with other components via network 400. In one particular implementation, device 110 comprises a smartphone capable of connecting to other components via a cellular data connection. In general, device 110 may include additional or alternative components as compared to those illustrated in FIG. 1, and it will be appreciated that the various embodiments disclosed herein are not limited to any particular configuration of device 110.

In certain embodiments, device 110 provides functionality that enables document originator 100 to generate a new document, modify an existing document, or retrieve an existing document form a storage resource. Examples of a storage resource which may be used in this regard include a local storage device, networked document repository 500, or a storage resource hosted by electronic signature server 300. In other implementations documents may additionally or alternatively be received from other users as part of a larger overarching workflow. For example, in one embodiment device 110 is used to draft a new bill of sale for an automobile that document originator 100 wishes to sell. In another embodiment a contract provider sends an email to document originator 100 containing standard terms of an automobile bill of sale which originator 100 can then modify to conform to the particular requirements of his/her particular application. In any case, document originator 100 uses input/output components 112 to generate a document that includes a wide range of digital assets. The various components that comprise the digital assent can be stored together as a single document or may be stored separately but remain connected by a logical association such as a network link.

Still referring to FIG. 1, document recipient 200 has access to a device 210 that enables document recipient 200 interact with other users and/or other components of the various systems that are illustrated in FIG. 1 and/or descried herein. For example, device 210 may comprise one or more of a variety of suitable computing devices, including devices such as handheld computers, cellular telephones, tablet computers, smartphones, laptop computers, desktop computers, and set-top boxes. Other devices or combinations of devices can be used in other embodiments. Device 210 includes components such as geolocation components 212 and a biometric scanning module 214. Biometric scanning module 214 comprises one or more of an iris scanner 214*a*, a retina scanner 214*b*, and a data encoding sub-module 214*c*. Device 210 also optionally includes input/output components such as one or more of a keyboard, a touch sensitive display, a pointing device, and/or any other suitable input/output device. Device 210 also optionally includes a wired and/or wireless communication module that enables communication with other components via network 400. In one particular implementation, device 210 comprises a smartphone capable of connecting to other components via a cellular data connection. In general, device 210 may include additional or alternative components as compared to those illustrated in FIG. 1, and it will be appreciated that the various embodiments disclosed herein are not limited to any particular configuration of device 210. In an alternative embodiment wherein document originator 100 is to electronically sign a document as well, the document originator's device 110 also includes a biometric scanning module that comprises one or more of an iris scanner, a retina scanner, and a data encoding sub-module.

In certain embodiments device 210 provides functionality that enables document recipient 200 to interact with and respond to a received document. Such interaction may comprise, for example, using input/output components to check a box indicating assent to terms associated with the received document, and using iris scanner 214*a* or retina scanner 214*b* to record an image of the iris or retina, respectively, of document recipient 200. An image of the iris, retina, or any other portion of the eye is generally referred to herein as an "ocular image". The recorded ocular image is encrypted using data encoding sub-module 214*c* and transmitted to electronic signature server 300 for subsequent authentication processing, as will be described in turn. Geolocation components 212 are optionally leveraged to record location information that defines or approximates a geographical location where document recipient 200 assented to the document terms. Electronic signature server 300 is also optionally configured to record and/or respond appropriately to feedback indicating that document recipient 200 does not assent to the terms of the received document. In general, the response of document recipient 200 can be incorporated into and stored together with the received document. The resulting supplemented document can be further processed according to a pre-established workflow.

Referring still to the example embodiment illustrated in FIG. 1, electronic signature server 300 can be configured to manage and orchestrate workflows that enable documents provided by document originator 100 to be distributed to document recipient 200, and that enable document recipient 200 to electronically sign, assent to the terms of, or otherwise interact with such documents. To this end, electronic signature server 300 includes one or more modules configured to implement certain of the functionalities disclosed herein, and optionally further includes hardware configured to enable such implementation. This hardware may include, but is not limited to a processor 310, a memory 320, an operating system 330, and a communication module 340. Processor 310 can be any suitable processor, and may include one or more coprocessors or controllers, such as an audio processor or a graphics processing unit, to assist in processing operations of electronic signature server 300. Memory 320 can be implemented using any suitable type of digital storage, such as one or more of a disk drive, a universal serial bus drive, flash memory, and/or random access memory. Operating system 330 may comprise any suitable operating system, such as Google Android (Google Inc., Mountain View, Calif.), Microsoft Windows (Microsoft Corp., Redmond, Wash.), or Apple OS X (Apple Inc., Cupertino, Calif.). As will be appreciated in light of this disclosure, the techniques provided herein can be implemented without regard to the particular operating system provided in conjunction with electronic signature server 300, and therefore may also be implemented using any suitable existing or subsequently developed platform. Communication module 340 can be any appropriate network chip or chipset which allows for wired and/or wireless communication via network 400 to external components such as one or more of the other components described herein. A bus and/or interconnect 390 may also be provided to allow for inter- and intra-device communications using, for example, communication module 340.

In certain embodiments electronic signature server 300 includes a configuration module 350 and a registration module 360. Configuration module 350 enables document originator 100 to define how a document should be assented to and how such assent should be authenticated. For example, configuration module 350 can be used to specify whether an iris image should be authenticated, a retina image should be authenticated, or any type of biometric data should be authenticated. Registration module 360 is configured to manage registration of reference ocular images, for example such as may be acquired when document recipient 200 wishes to begin using services provided by electronic signature server 300. For example, in certain embodiments registration module 360 manages a collection of reference ocular images stored in authentication data repository 700.

In such embodiments electronic signature server 300 further includes an interactivity module 370 configured to provide an interface to users accessing the workflows and resources managed by electronic signature server 300. Such an interface may be provided by way of a graphical user interface rendered on a digital display, although other types of interfaces, such as voice response, touchtone, and textual interfaces, can be implemented as well. Separate user interfaces can be provided to document originator 100 and document recipient 200. For example, in one embodiment interactivity module 370 is configured to generate a graphical user interface capable of receiving commands, parameters, and/or other metadata that define a workflow from document originator 100. Such parameters may specify, for example, how a particular document is to be routed amongst a plurality of document recipients 200, and how electronic signature server 300 should respond to various input from the various document recipients 200. Likewise, interactivity module 370 is also configured to generate a user interface capable of guiding document recipient 200 through the process of obtaining, reviewing, assenting to (or declining to assent to), and/or otherwise interacting with a document. Additional or alternative workflow aspects may be specified in other embodiments, and thus it will be appreciated that the various embodiments disclosed herein are not limited to any particular functionality provided by interactivity module 370.

Referring still to FIG. 1, electronic signature server 300 may also include a document status module 380 in certain embodiments. Document status module 380 can be configured to manage the status of documents that are used in a workflow orchestrated by electronic signature server 300. To this end, in certain embodiments document status module 380 comprises a document status database or other document status data structure that stores information with respect to the various documents used in a workflow. Such information may include, for example, whether a particular document has been submitted for signature to document recipient 200, and/or whether document recipient 200 has recorded an assent to the document, has declined to assent to the document, or has invoked another workflow process (such as by forwarding the document to an the alternative document recipient). Such information may also indicate whether a recorded assent has been authenticated. The data structure provided by document status module 380 may be stored locally at electronic signature server 300, may be stored remotely at an optional networked document status repository (not illustrated), or may be stored in the same document repository as the document itself, such as in networked document repository 500. Document status module 380 may further comprise software and/or instructions configured to manage such a data structure. In certain embodiments a user can use interactivity module 370 to obtain information from document status module 380, such as by submitting a query to search for, for example, unsigned documents in a given workflow, or the status or audit trail of a particular document in a given workflow.

Certain embodiments of the computer system illustrated in FIG. 1 include supplementary resources, such as a networked document repository 500 and a networked authentication data repository 700. For example, the documents managed using the various systems disclosed herein can be stored in document repository 500, thus advantageously allowing such documents to be accessed by a large number of document originators and document recipients without regard to whether other components of the system are available at any given time. However, in alternative embodiments the documents may be retained in storage that is local to electronic signature server 300, such as that provided by memory 320, or in storage that is local to document originator's device 110 and/or document recipient's device 210. Authentication data repository 700, on the other hand, is configured to store a collection of encrypted reference ocular images. Although authentication data repository 700 is a secure data repository with restricted access. Storing hashed or otherwise encrypted versions of the reference ocular images mitigates the damage which would result from a security breach. Authentication data repository 700 optionally also stores data derived from or otherwise associated with the reference ocular images, such as a digital key issued in lieu of a reference ocular image. In other embodiments the encrypted reference ocular images are retained in storage that is local to electronic signature server 300, such as that provided by memory 320.

Certain embodiments of the computer system illustrated in FIG. 1 include authentication resources (not illustrated) which are either networked or integrated into electronic signature server 300. Such authentication resources can be configured to implement any appropriate existing or subsequently developed authentication scheme for comparing a reference ocular image with an ocular image that is acquired from document recipient 200. If the acquired image matches or substantially matches the reference image, then an electronic signature or other expression of assent received from document recipient 200 can be considered authentic and legally binding. In this context, the ocular images can be considered to be substantially matching where there exists a reasonably high likelihood that the images were derived from the same person. In alternative implementations an authenticated ocular image—which may be acquired from either document originator 100 or document recipient 200—can also be used as a key to secure access to a restricted document. Authentication procedures can therefore be applied to secure individual documents, for example, such that document originator 100 may specify that an ocular image must be authenticated before document recipient 200 is allowed to access, sign or otherwise interact with the document. This provides document originator 100 with additional assurance that the document has not been accessed, executed, or otherwise interacted with by an unauthorized party. In general, the ocular image saved in authentication data repository 700 can be provided as part of an initial registration process that is managed by registration module 360.

It will be appreciated that additional or alternative supplementary resources may be provided in still other embodiments. Examples of such supplementary resources include a document status repository as described herein in conjunction with document status module 380; transcription services that allow document originator and/or document recipient to interact with the document and the electronic signature server 300 aurally and/or orally; and video analysis services that enable facial features and/or gestures to be recognized and stored in a visual assent that is received from document recipient. Such supplementary resources may be networked or integrated into and provided by electronic signature server 300. Either way, this advantageously eliminates any need for such resources to be provided locally at document originator's device 110 or at document recipient's device 210. Thus document originator 100 and document recipient 200 can leverage the functionality provided by electronic signature server 300 without the need to obtain specialized hardware or software. This in turn provides networked functionality to users of devices having limited processing capability, such as public kiosks, smartphones, and tablet computers.

Document originator 100, document recipient 200, and electronic signature server 300 can communicate with each other via network 400. Network 400 can also be used to access supplementary resources such as networked document repository 500 and authentication data repository 700. Network 400 may be a local area network (such as a home-based or office network), a wide area network (such as the Internet), or a combination of such networks, whether public, private, or both. For example, in certain embodiments at least a portion of the functionality associated with network 400 is provided by a cellular data network, thereby making it easier for users of smartphones and tablet computers to interact with electronic signature server 300. In general, communications amongst the various entities and resources described herein may occur via wired and/or wireless connections, such as may be provided by Wi-Fi or mobile data networks. In some cases access to resources on a given network or computing system may require credentials such as a username and password, and/or may require compliance with any other suitable security mechanism. Furthermore, while only one document originator 100 and one document recipient 200 are illustrated in the example embodiment of FIG. 1, it will be appreciated that in general the system may comprise a distributed network of tens, hundreds, thousands, or more document originators 100 and/or document recipients 200 capable of interacting with a correspondingly large number of electronic signature servers 300.

The embodiments disclosed herein can be implemented in various forms of hardware, software, firmware, and/or special purpose processors. For example, in one embodiment a non-transitory computer readable medium has instructions encoded thereon that, when executed by one or more processors, cause one or more of the document distribution and interaction methodologies described herein to be implemented. The instructions can be encoded using any suitable programming language, such as C, C++, object-oriented C, JavaScript, Visual Basic .NET, BASIC, or alternatively, using custom or proprietary instruction sets. Such instructions can be provided in the form of one or more computer software applications and/or applets that are tangibly embodied on a memory device, and that can be executed by a computer having any suitable architecture. In one embodiment the system can be hosted on a given website and implemented, for example, using JavaScript or another suitable browser-based technology.

The functionalities disclosed herein can optionally be incorporated into other software applications, such as document management systems or document viewers. For example, an application configured to view portable document format (PDF) files can be configured to implement certain of the functionalities disclosed herein upon detecting the presence of signature fields or other metadata in a given document, including signature fields intended for a handwritten signature. The systems disclosed herein may also optionally leverage services provided by other software applications, such as electronic mail readers. The computer software applications disclosed herein may include a number of different modules, sub-modules, or other components of distinct functionality, and can provide information to, or receive information from, still other components and/or subcomponents. These modules can be used, for example to communicate with input and/or output devices such as a display screen, a touch sensitive surface, a printer, and/or any other suitable input/output device. Other components and functionality not reflected in the illustrations will be apparent in light of this disclosure, and it will be appreciated that the various embodiments disclosed herein are not limited to any particular hardware or software configuration. Thus in other embodiments electronic signature server 300 may comprise additional, fewer, or alternative subcomponents as compared to those included in the illustrated embodiments.

The aforementioned non-transitory computer readable medium may be any suitable medium for storing digital information, such as hard drive, a server, a flash memory, and/or random access memory. In alternative embodiments, the computers and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that the present disclosure is not intended to be limited to any particular system architecture.

Methodology

Figure 2A:
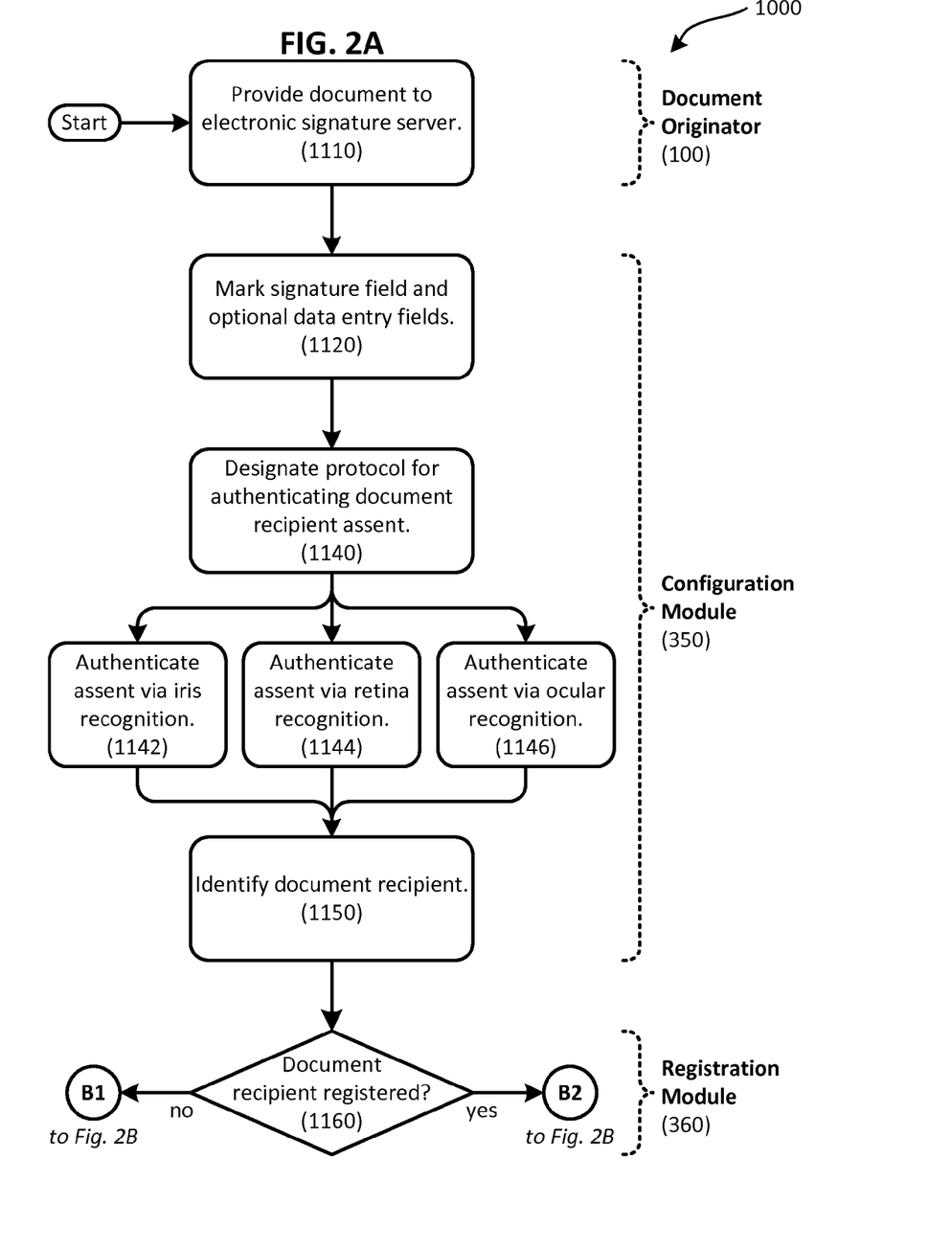
FIGS. 2A and 2B comprise a flowchart illustrating an example method for configuring a document and registering biometric data associated with a document recipient before soliciting the document recipient's assent to the configured document.
Figure 2B:
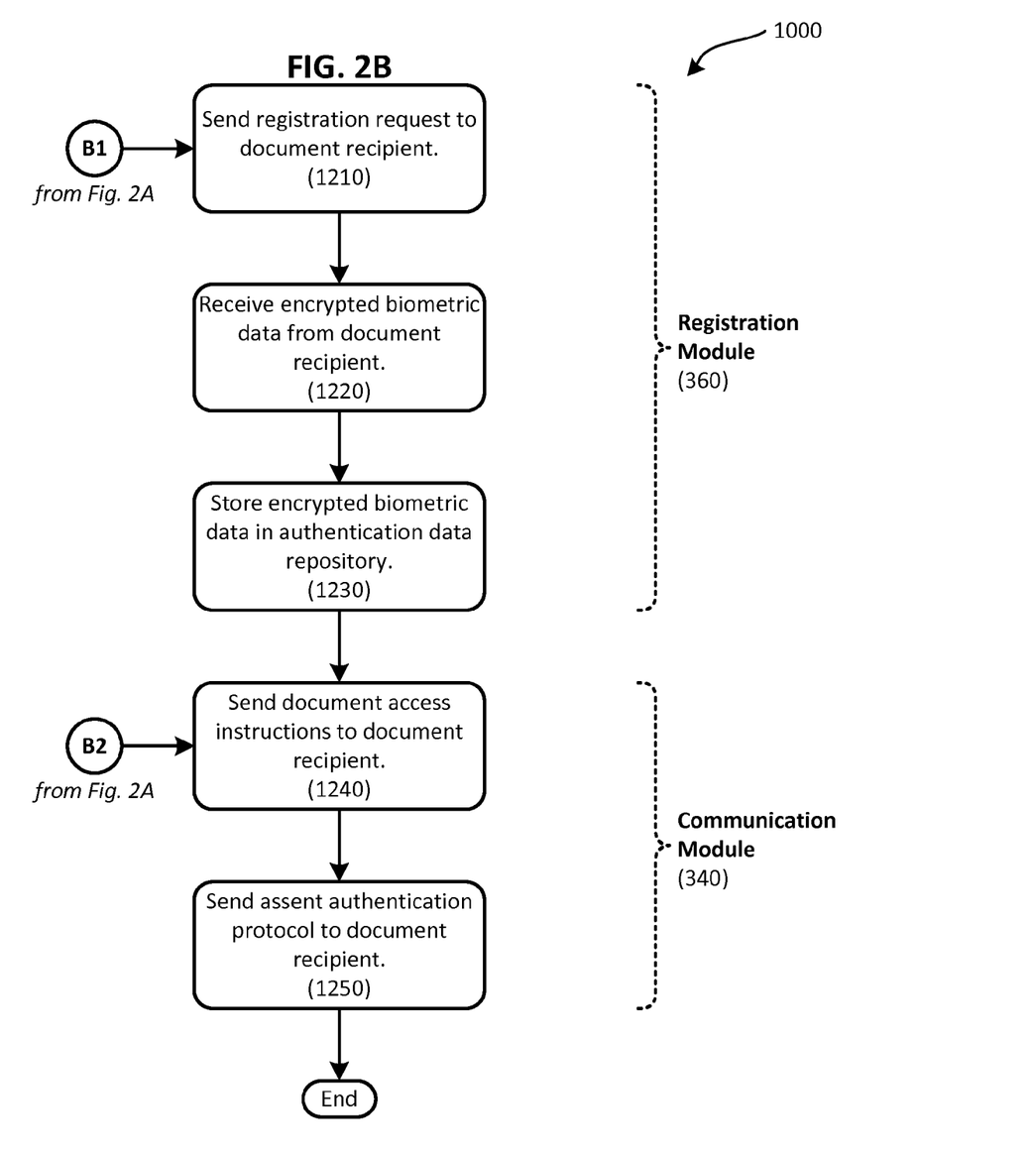
Figure 3A:
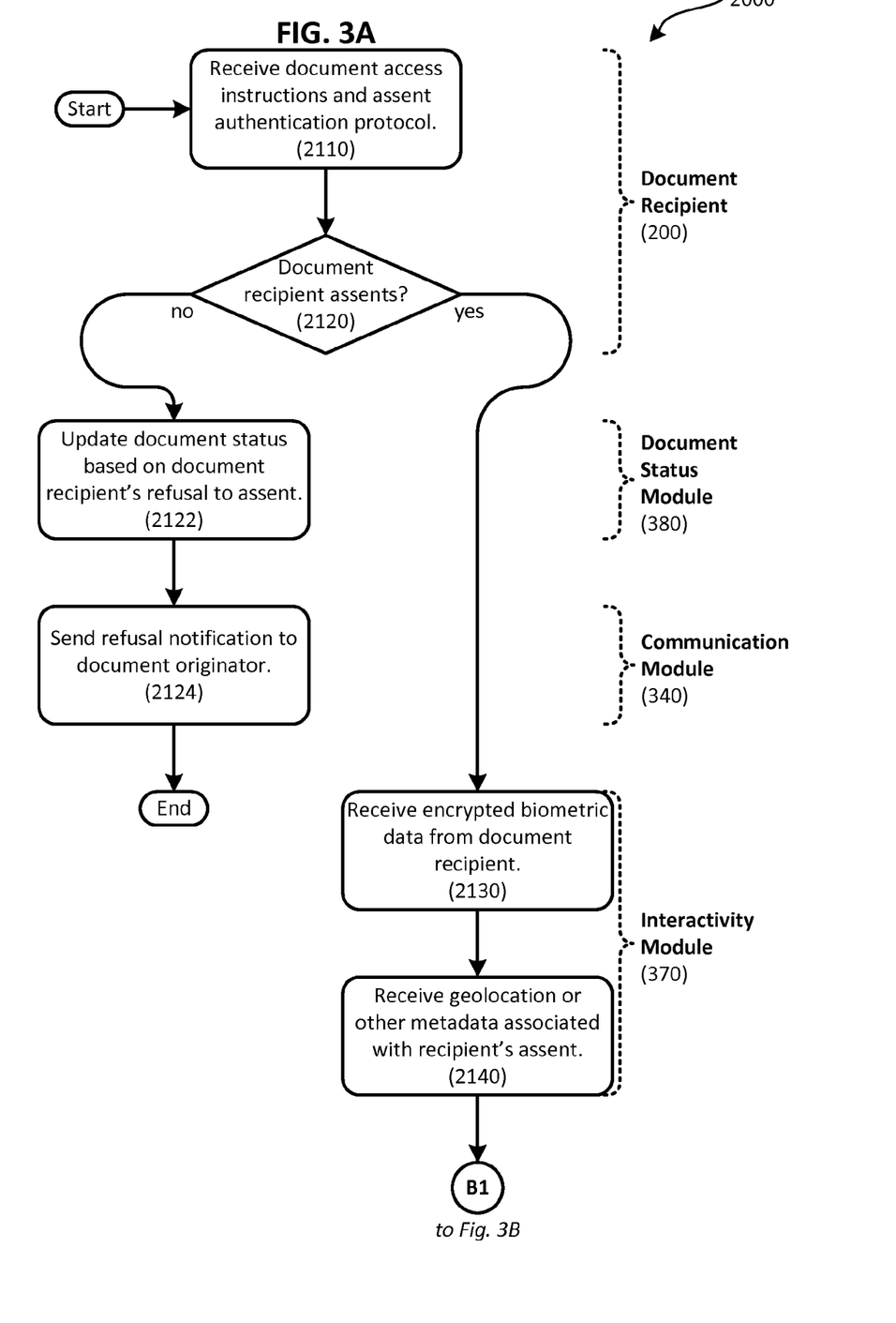
FIGS. 3A and 3B comprise a flowchart illustrating an example method for soliciting and authenticating an electronic assent from a document recipient using biometric data.
Figure 3B:
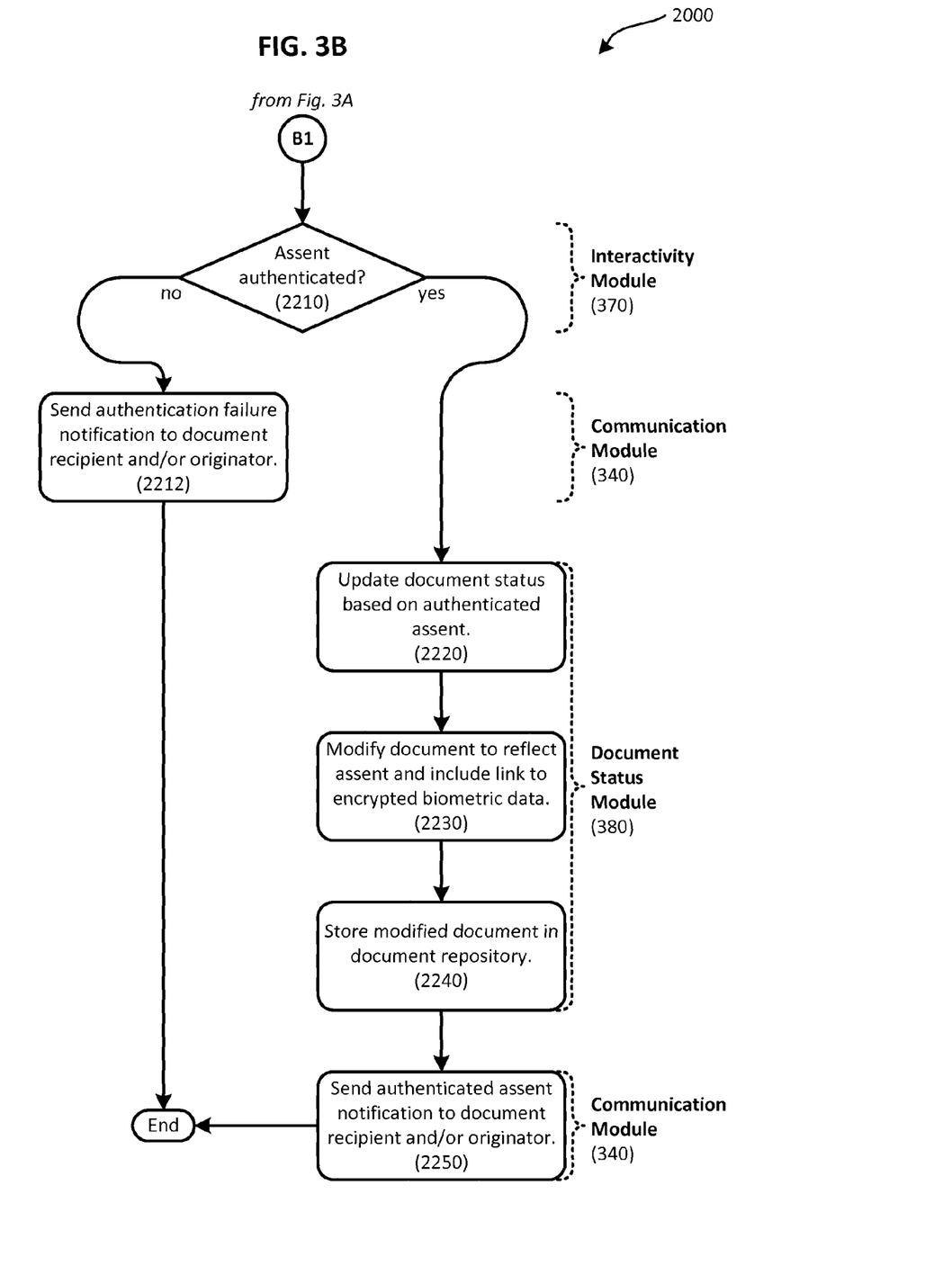

FIGS. 2A and 2B comprise a flowchart illustrating an example method 1000 for configuring a document and registering biometric data associated with document recipient 200 before soliciting the document recipient's assent to the configured document. FIGS. 3A and 3B comprise a flowchart illustrating an example method 2000 for soliciting and authenticating an electronic assent from document recipient 200 using biometric data. As can be seen, these methods include a number of phases and sub-processes, the sequence of which may vary from one embodiment to another. However, when considered in the aggregate, these phases and sub-processes form a complete document distribution and interaction process that is responsive to user input in accordance with certain of the embodiments disclosed herein. These methodologies can be implemented, for example, using the system architecture illustrated in FIG. 1 and described herein. However other system architectures can be used in other embodiments, as will be apparent in light of this disclosure. To this end, the correlation of the various functionalities shown in FIGS. 2A, 2B, 3A, and 3B to the specific components illustrated in FIG. 1 is not intended to imply any structural and/or use limitations. Rather other embodiments may include, for example, varying degrees of integration where multiple functionalities are effectively performed by one system. For example, in an alternative embodiment a single module can be used to provide user interactivity and maintenance of document status. Thus other embodiments may have fewer or more modules depending on the granularity of implementation. Numerous variations and alternative configurations will be apparent in light of this disclosure.

As illustrated in FIG. 2A, method 1000 commences with document originator 100 providing a document to electronic signature server 300. See reference numeral 1100 in FIG. 2A. This can be accomplished, for example, by uploading or providing a location of a document to server 300 from networked document repository 500 or from local storage provided at document originator's device 110. In some cases document originator 100 provides the document to electronic signature server 300 on his/her own accord. In other cases, document originator 100 provides the document to electronic signature server 300 in response to a request for a document, such as a request from document recipient 200. For example, a new customer (document recipient) may request a license agreement from a software vendor (document originator), in response to which the software vendor provides the new license agreement to electronic signature server 300 and configures the rules that govern how the new consumer's electronic signature on the license agreement should be solicited and authenticated.

Regardless of how method 1000 commences, document originator 100 can use configuration module 350 to mark one or more signature fields, as well as one or more optional data fields identified in the provided document. See reference numeral 1120 in FIG. 2A. Such field marking can be performed automatically based on any suitable field detection algorithm, or can be performed based partially or solely on input from document originator 100. For example, in one embodiment metadata tags inserted into the document by document originator 100 at the time of creation to provide an indication of how configuration module 350 should mark the signature and data fields. In an alternative embodiment, document originator 100 marks the fields manually after the document has been provided to, and optionally analyzed by, electronic signature server 300.

In certain embodiments document originator 100 uses configuration module 350 to designate a protocol for authenticating an electronic signature or other expression of assent that is provided by document recipient 200. See reference numeral 1140 in FIG. 2A. The designated protocol is optionally associated with one or more of the previously-identified signature fields, such that upon receiving the document, recipient 200 can click on or otherwise select a signature field to invoke the designated protocol for authenticating the recipient's assent. In some cases configuration module 350 designates the protocol for authenticating the assent based on a predefined default setting, such as a global default authentication protocol for all document recipients, or a default authentication protocol associated with a particular document recipient or class of document recipients. For example, document recipients within a first legal jurisdiction may be required to authenticate their assent via iris recognition, while document recipients within a second legal jurisdiction may be required to authenticate their assent via retina recognition. In other cases configuration module 350 designates the authentication protocol based on a command received from document originator 100.

FIG. 2A illustrates three example protocols for authenticating an electronic signature or other expression of assent from document recipient 200. For example, in one implementation electronic signature server 300 can be configured to authenticate an electronic signature or other expression of assent using iris recognition technology. See reference numeral 1142 in FIG. 2A. Iris recognition systems acquire an image of a person's iris while being illuminated by light in the near infrared wavelength band, and then extract a one-way cryptographic hash from the acquired image using a suitable encryption algorithm. In another implementation electronic signature server 300 can be configured to authenticate an electronic signature or other expression of assent using retina recognition technology. See reference numeral 1144 in FIG. 2A. Retina recognition systems acquire an image of a person's retina by casting an unperceived beam of low-energy infrared light into a person's eye. Because retinal blood vessels absorb this light more readily than other ocular tissues, the reflected light produces an individualized retinal image from which a one-way cryptographic hash can be extracted using a suitable encryption algorithm. In still other embodiments authentication can be based on any suitable ocular recognition technology, for example depending on the hardware available to a given document recipient. See reference numeral 1146 in FIG. 2A. It will be appreciated that ocular recognition technology can be applied to one or two eyes, and thus in certain embodiments document originator 100 can use configuration module 350 to define whether ocular images should be acquired from one or both eyes of document recipient 200.

Document originator 100 can also use configuration module 350 to identify document recipient 200. See reference numeral 1150 in FIG. 2A. In one embodiment document recipient 200 is identified via an electronic mail address, although any other suitable identification technique can be used, including use of a identification number, a username, or a real name. In some cases document originator 100 can select a name from an address book or other directory of registered document recipients 200. Depending on the particular workflow, document originator may identify multiple recipients who should have an opportunity to assent to the document terms. Once document recipient 200 has been identified, registration module 360 can be configured to determine whether document recipient 200 has previously registered with electronic signature server 300. See reference numeral 1160 in FIG. 2A. In one embodiment, document recipient 200 is considered to have been registered if authentication data repository 700 contains ocular image data that was acquired from document recipient 200, and that can be used for authentication of subsequently acquired ocular image data.

If the identified document recipient 200 has not previously registered with electronic signature server 300, registration module 360 can be configured to send a registration request to document recipient 200. See reference numeral 1210 in FIG. 2B. In one embodiment the registration request is transmitted via electronic mail, although other embodiments may use other communication techniques to transmit the request. Regardless of how it is transmitted, the registration request includes instructions that guide document recipient 200 through the process of submitting a reference ocular image. In some cases the registration request includes interactive elements that prompt document recipient 200 to provide information regarding imaging hardware available at document recipient's device 210. In other implementations the registration request includes code or other active components capable of analyzing recipient's device 210 and determining its capabilities vis-à-vis ocular image acquisition. Registration module 360 is optionally configured to refuse the registration request if it is determined that recipient's device lacks the hardware appropriate for acquisition of a suitable ocular image.

Where recipient's device 210 is capable of acquiring the ocular image specified by the previously designated protocol, document recipient 200 can follow the received instructions to acquire the image. In certain implementations, for example where recipient's device 210 includes data encoding sub-module 214c, the acquired image is encoded upon acquisition, such that only a one-way cryptographic hash is actually transmitted to electronic signature server 300. In this case, registration module 360 receives encrypted biometric data from document recipient 200. See reference numeral 1220 in FIG. 2B. In other embodiments a greyscale version of the acquired image is transmitted to electronic signature server 300. Transmission of a greyscale image allows bandwidth to be reduced without adversely affecting the efficacy of subsequent encryption and authentication protocols. In other embodiments, a one-way cryptographic hash is generated from the greyscale version of the acquired image. Regardless of where it is generated, the hash can be encoded using a salt provided by electronic signature server 300, for example by registration module 360. Hashing the acquired ocular image makes it infeasible to derive the originally scanned image from the hash, while still allowing two hashes to be compared and authenticated as having originated from the same eye. This provides an additional layer of security that mitigates the damage which might otherwise result if the hash were to be acquired by an unauthorized party. Registration module 360 is configured to store the encrypted biometric data—for example, the one-way cryptographic hash—in authentication data repository 700. See reference numeral 1230 in FIG. 2B. In such embodiments the encrypted biometric data is stored with user profile details that identify the corresponding document recipient.

Once document recipient 200 is registered, or if document recipient 200 has already been registered, communications module 340 can be configured to send instructions for accessing the document to document recipient 200. See reference numeral 1240 in FIG. 2B. Communications module 340 can also be configured to send the designated assent authentication protocol to document recipient 200. See reference numeral 1250 in FIG. 2B. In one embodiment an address corresponding to a location where the document is stored in networked document repository 500 is provided to document recipient 200, while in other embodiments the document itself is provided to document recipient 200. The designated assent authentication protocol can be provided in any form that is appropriate for document recipient 200, including in the form of textual instructions, in the form of an audio recording, in the form of an audiovisual recording, or in the form of machine readable binary instructions configured to be executed at recipient's device 210. In certain embodiments access permissions for document recipient 200 vis-à-vis the document are verified before actually sending instructions for accessing the document.

Once a document has been configured for an electronic signature processing workflow, the document can be provided to document recipient 200 for electronic signature and subsequent authentication of such signature. To this end, FIGS. 3A and 3B comprise a flowchart illustrating an example method 2000 for soliciting and authenticating an electronic assent from document recipient 200 using biometric data. Method 2000 commences with document recipient 200 receiving document access instructions and the previously designated assent authentication protocol. See reference numeral 2110 in FIG. 3A. This enables document recipient 200 to access and review the document, and optionally, the assent authentication protocol. The document can be reviewed in any suitable application, such as in a web browser, in an application specifically associated with the document itself (such as a proprietary word processing application used to create the document), or in a viewer application that is native to electronic signature server 300. Based on such review, document recipient 200 decides whether or not to assent to the document terms. See reference numeral 2120 in FIG. 3A.

If document recipient 200 elects not to assent to the document terms, document status module 380 updates a status associated with the document for purposes of recording the refusal to assent. See reference numeral 2122 in FIG. 3A. Communications module 340 is optionally configured to send a refusal notification to document originator 100. See reference numeral 2124 in FIG. 3A. If, on the other hand, document recipient 200 elects to assent to the document terms, an electronic assent can be recorded in accordance with instructions generated by configuration module 350. For example, in one embodiment the electronic assent comprises an electronic signature that is recorded in response to document recipient 200 drawing a signature on a touch sensitive surface. In another embodiment the electronic assent comprises an audiovisual recording of document recipient vocalizing and/or gesturing his/her assent. In yet another embodiment the electronic assent comprises one or more interactions with graphical user interface elements, such as toggling a checkbox and clicking an acceptance button. A wide range of other forms of electronic assent can be used in other embodiments. For example, in certain embodiments an ocular image itself can be considered to be an electronic assent. Regardless of how document recipient 200 electronically assents, such assent can be recorded in accordance with the established instructions.

In one particular implementation, when document recipient 200 clicks on, taps, or otherwise selects a signature field in the received document, instructions for acquiring an ocular image are displayed. The instructions can be configured to prompt document recipient 200 to provide an ocular image that, once acquired, is optionally encrypted or used to generate a one-way cryptographic hash, as disclosed herein in the context of the initial user registration process. Interactivity module 370 is configured to receive the encrypted biometric data or the hash from document recipient 200. See reference numeral 2130 in FIG. 3A. In alternative embodiments, wherein encryption of the ocular image occurs at electronic signature server 300, interactivity module 370 is configured to receive an unencrypted version of the ocular image, such as a greyscale rendering of the ocular image, from document recipient 200. Geolocation data, timestamp data, or other metadata associated with the recorded assent is also optionally recorded. See reference numeral 2140 in FIG. 3A. In some applications geolocation and/or timestamp data can be used as part of the assent authentication process, such as by presenting such data to document originator 100 or other parties for review as part of an automatically generated audit trail associated with the recorded assent. Other identifying data associated with recipient's device 210, such as a device identifier, a model number, a form factor, or a network address can additionally or alternatively be recorded for similar purposes. In general, interactivity module 370 can be understood as being able to control certain hardware associated with recipient's device 210, thus enabling features such as geolocation components 212 and biometric scanning module 214 to be activated and leveraged in a controllable manner.

In certain embodiments interactivity module 370 compares a cryptographic hash that is associated with document recipient 200 and that is stored in authentication data repository 700 with the cryptographic hash received from document recipient 200. This enables interactivity module 370 to make a determination with respect to whether the electronic signature or other recorded assent should be authenticated. See reference numeral 2210 in FIG. 3B. If the hashed ocular images cannot be authenticated, document recipient 200 is optionally provided with an opportunity to record another ocular image. If document recipient 200 is unable to provide an authenticable ocular image, communication module 340 can be configured to send an authentication failure notification to document recipient 200 and/or document originator 100. See reference numeral 2212 in FIG. 3B.

On the other hand, if the assent can be authenticated, document status module 380 updates a status associated with the document accordingly. See reference numeral 2220 in FIG. 3B. Such status can be maintained, for example, in a document status repository that forms part of electronic signature server 300, or that is alternatively implemented as a networked resource. In some applications authentication of the assent causes the document to be considered a legally binding document. The authenticated assent can be archived, for example in networked document repository 500. The authenticated assent is also optionally embedded in the document itself as an attachment or other supplemental content item. In embodiments where geolocation and/or other identifying data associated with the recorded assent is available, such data can be archived and/or embedded as well. This facilitates generation of a robust audit trail for an electronic document and its authenticated assent. It also enables electronic signature server 300 to automatically complete certain form fields in the electronically signed document. In some cases document recipient 200 may be provided with a confirmation copy of the authenticated assent before the document status is updated, thereby providing document recipient 200 with an opportunity to confirm his/her assent.

Figure 4:
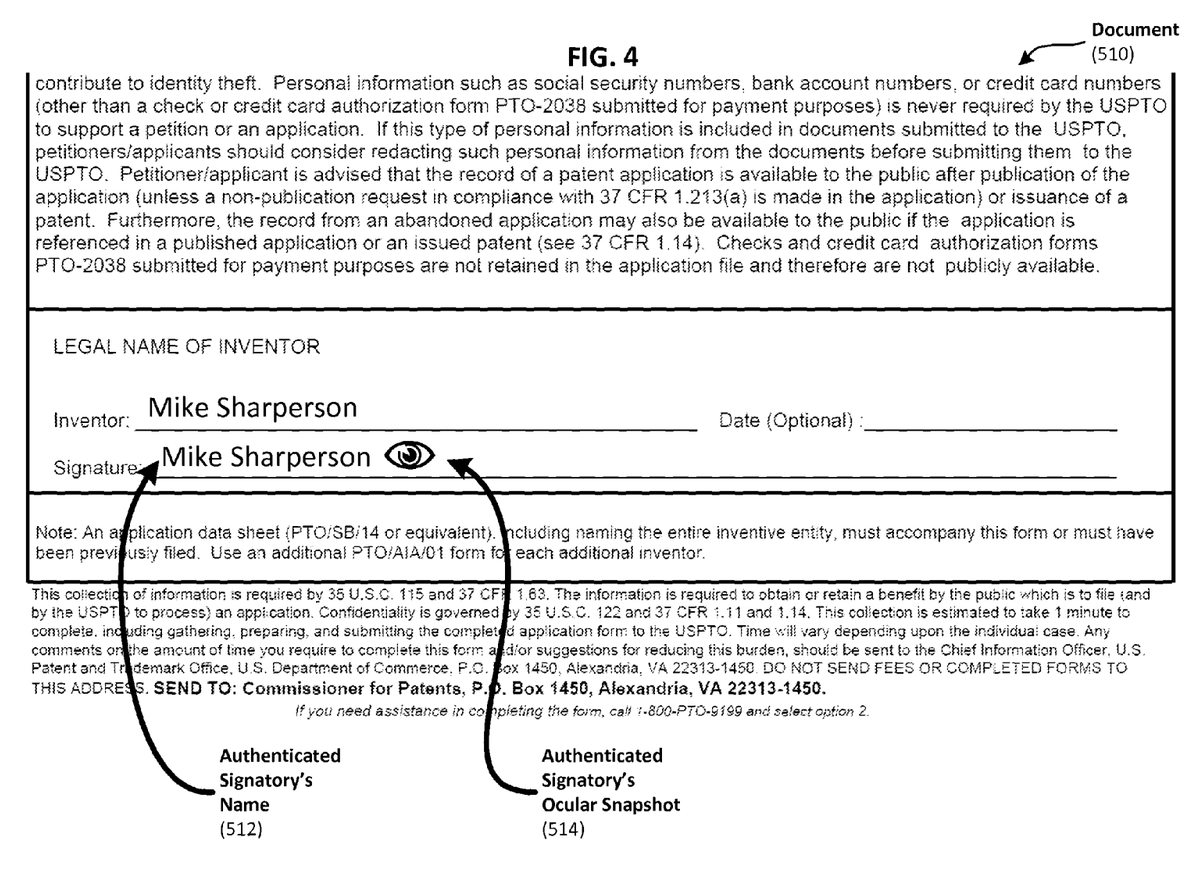
FIG. 4 illustrates an example graphical representation of a document that is associated with a biometrically authenticated electronic assent, wherein the document includes a snapshot of an ocular image.

The signed document is optionally modified to indicate that a biometrically authenticated assent is associated with the document and to include an optional link to the encrypted biometric data or to other information that could be used to audit the authentication workflow. See reference numeral 2230 in FIG. 3B. For example, in one implementation an authenticated signatory's name is placed on the document in a location where a signature might normally be placed. FIG. 4 illustrates an example graphical representation of a document 510 that is associated with a biometrically authenticated electronic assent, wherein document 510 includes an authenticated signatory's ocular snapshot 514. An authenticated signatory's name 512 appears adjacent to snapshot 514. Snapshot has a sufficiently low resolution such that it is impossible to derive the signatory's ocular image therefrom. In such embodiments snapshot 514 functions as an easily recognizable visual indication that an authenticated assent has been recorded and is available for inspection or auditing. In modified embodiments other visual indicia can be used for this purpose, such as a generalized icon. The visual indicia may also be positioned differently, such as in a margin of the document or as a watermark rendered behind authenticated signatory's name 512.

Document status module can be configured to store the modified document in document repository 500. See reference numeral 1240 in FIG. 3B. Communications module 340 is optionally configured to send an authentication notification to document originator 100 and/or document recipient 200. See reference numeral 2250 in FIG. 2B. In some embodiments the authentication notification includes a link to the authenticated assent itself.

CONCLUSION

Numerous variations and configurations will be apparent in light of this disclosure. For instance one example embodiment provides a computer-implemented document processing method that comprises receiving, from a document originator, metadata that identifies a document that is to be distributed to a document recipient as part of a workflow. The document includes one or more document terms. The method further comprises designating a protocol for authenticating an assent to the one or more document terms that is provided by the document recipient. The protocol establishes an ocular recognition technology. The method further comprises providing, to the document recipient in response to a received request, instructions for processing an ocular image in accordance with the protocol. The method further comprises receiving, from the document recipient, the assent and a processed ocular image acquired from the document recipient in accordance with the protocol. The method further comprises comparing the processed ocular image with a reference ocular image stored in an authentication data repository. The method further comprises, in response to determining that the processed ocular image and the reference ocular image were derived from the document recipient, updating a status associated with the document to indicate that the document recipient has assented to the one or more document terms. In some cases the method further comprises sending the document originator a notification indicating that the document recipient provided the assent, and that the assent was authenticated using the ocular recognition technology. In some cases the method further comprises applying a one-way cryptographic hashing algorithm to the processed ocular image, thereby producing a hash of the processed ocular image, wherein said comparing comprises comparing the hash of the processed ocular image to a hash of the reference ocular image. In some cases the processed ocular image comprises a one-way cryptographic hash of an ocular image acquired from the document recipient. In some cases the received request is received from the document recipient. In some cases the metadata received from the document originator further defines the protocol for authenticating the assent to the one or more document terms. In some cases the protocol establishes that an iris image should be acquired from the document recipient. In some cases the protocol establishes that a retinal image should be acquired from the document recipient.

Another example embodiment provides an electronic signature system that comprises a document repository storing a document comprising a plurality of document terms. The system further comprises an authentication data repository storing a plurality of reference ocular image datasets for a corresponding plurality of users. Each reference ocular image dataset is associated with user identification information that identifies one of the users. The system further comprises a configuration module adapted to generate instructions for processing an ocular image in accordance with an ocular recognition technology, and to associate the instructions with the document. The system further comprises an interactivity module configured to receive, from a document recipient, an assent to the document terms and an ocular image dataset that is acquired in accordance with the instructions. The interactivity module is further configured to authenticate the assent by matching the received ocular image dataset with one of the reference ocular image datasets stored in the authentication data repository. The system further comprises a document status module configured to update a status associated with the document to indicate that the document recipient has assented to the document terms. In some cases (a) the document status module is further configured to add a visual indicia to the document in response to authentication of the assent; and (b) the visual indicia comprises a graphical representation of the received ocular image dataset. In some cases the system further comprises a registration module configured to (a) receive a reference ocular image dataset from the document recipient, and (b) store the reference ocular image dataset that is received from the document recipient in the authentication data repository. In some cases the assent comprises an electronic signature generated as a result of an interaction between the document recipient and one or more user interface elements that are generated by the interactivity module and transmitted to the document recipient. In some cases status associated with the document is stored in the document repository. In some cases (a) the received ocular image dataset comprises a greyscale ocular image; and (b) the interactivity module is further configured to generate an encrypted version of the received ocular image dataset using a one-way cryptographic hashing function.

Another example embodiment provides a computer program product encoded with instructions that, when executed by one or more processors, causes a document workflow process to be carried out. The process comprises receiving, from a document originator, metadata that identifies a document that is to be distributed to a document recipient as part of a workflow. The document includes a plurality of document terms. The process further comprises designating a protocol for authenticating an assent to the document terms that is provided by the document recipient. The protocol establishes an ocular recognition technology. The process further comprises providing, to the document recipient in response to a received request, instructions for processing an ocular image in accordance with the protocol. The process further comprises receiving, from the document recipient, the assent and a processed ocular image acquired from the document recipient in accordance with the protocol. The process further comprises comparing the processed ocular image with a reference ocular image stored in an authentication data repository. The process further comprises, in response to determining that the processed ocular image and the reference ocular image were derived from the document recipient, updating a status associated with the document to indicate that the document recipient has assented to the document terms. In some cases the process further comprises adding a visual indicia to the document in response to determining that the processed ocular image and the reference ocular image were derived from the document recipient. In some cases the process further comprises (a) receiving geolocation data that corresponds to a geographic location where the assent occurred; and (b) providing the geolocation data to the document originator along with a notification indicating that the document recipient provided an authenticated assent. In some cases the protocol establishes that at least one of an iris image and a retinal image should be acquired from the document recipient. In some cases the received request is automatically generated as part of the workflow. In some cases the processed ocular image comprises a one-way cryptographic hash that is encoded using a salt that is associated with the document recipient The foregoing description has been presented for the purposes of illustration and description. It is not intended to be exhaustive or to limit the invention to the particular disclosed embodiments. Many modifications and variations are possible in light of this disclosure. Thus it is intended that the scope of the invention be limited not by this detailed description, but rather by the claims appended hereto.

This disclosure is related to U.S. patent application Ser. No. 14/069,674 (filed 1 Nov. 2013), the entire disclosure of which is hereby incorporated by reference herein. This disclosure is related to U.S. patent application Ser. No. 14/534,583 (filed 6 Nov. 2014), the entire disclosure of which is hereby incorporated by reference herein. This disclosure is related to U.S. patent application Ser. No. 14/551,560 (filed 24 Nov. 2014), the entire disclosure of which is hereby incorporated by reference herein.

What is claimed is:

1. A computer-implemented document processing method that comprises:
   receiving, from a document originator, metadata that identifies a document that is to be distributed to a document recipient as part of a workflow, wherein the document includes one or more document terms;
   designating a protocol for authenticating an assent to the one or more document terms that is provided by the document recipient, wherein the protocol establishes an ocular recognition technology;
   providing, to the document recipient in response to a received request, instructions for processing an ocular image in accordance with the protocol;
   receiving, from the document recipient, the assent and a processed ocular image acquired from the document recipient in accordance with the protocol;
   comparing the processed ocular image with a reference ocular image stored in an authentication data repository; and
   in response to determining that the processed ocular image and the reference ocular image were derived from the document recipient, (a) updating audit data associated with the document to indicate that the document recipient has assented to the one or more document terms, (b) adding to the document a graphical representation of the processed ocular image, and (c) adding to the document a link to the updated audit data.

2. The method of claim 1, further comprising sending the document originator a notification indicating that the document recipient provided the assent, and that the assent was authenticated using the ocular recognition technology.

3. The method of claim 1, further comprising applying a one-way cryptographic hashing algorithm to the processed ocular image, thereby producing a hash of the processed ocular image, wherein said comparing comprises comparing the hash of the processed ocular image to a hash of the reference ocular image.

4. The method of claim 1, wherein the processed ocular image comprises a one-way cryptographic hash of an ocular image acquired from the document recipient.

5. The method of claim 1, wherein the received request is received from the document recipient.

6. The method of claim 1, wherein the metadata received from the document originator further defines the protocol for authenticating the assent to the one or more document terms.

7. The method of claim 1, wherein the protocol establishes that an iris image should be acquired from the document recipient.

8. The method of claim 1, wherein the protocol establishes that a retinal image should be acquired from the document recipient.

9. An electronic signature system that comprises:
 a document repository storing a document comprising a plurality of document terms;
 an authentication data repository storing a plurality of reference ocular image datasets for a corresponding plurality of users, wherein each reference ocular image dataset is associated with user identification information that identifies one of the users;
 a configuration module adapted to generate instructions for processing an ocular image in accordance with an ocular recognition technology, and to associate the instructions with the document;
 an interactivity module configured to (a) receive, from a document recipient, an assent to the document terms and an ocular image dataset that is acquired in accordance with the instructions, and (b) authenticate the assent by matching the received ocular image dataset with one of the reference ocular image datasets stored in the authentication data repository; and
 a document status module configured to (a) update audit data associated with the document to indicate that the document recipient has assented to the document terms, and (b) add a visual indicium to the document in response to authentication of the asset, wherein the visual indicium comprises a link to the audit data and a graphical representation of the received ocular image dataset.

10. The electronic signature system of claim 9, further comprising a registration module configured to (a) receive a reference ocular image dataset from the document recipient, and (b) store the reference ocular image dataset that is received from the document recipient in the authentication data repository.

11. The electronic signature system of claim 9, wherein the assent comprises an electronic signature generated as a result of an interaction between the document recipient and one or more user interface elements that are generated by the interactivity module and transmitted to the document recipient.

12. The electronic signature system of claim 9, wherein the audit data associated with the document is stored in the document repository.

13. The electronic signature system of claim 9, wherein:
 the received ocular image dataset comprises a greyscale ocular image; and
 the interactivity module is further configured to generate an encrypted version of the received ocular image dataset using a one-way cryptographic hashing function.

14. A computer program product encoded with instructions that, when executed by one or more processors, causes a document workflow process to be carried out, the process comprising:
 receiving, from a document originator, metadata that identifies a document that is to be distributed to a document recipient as part of a workflow, wherein the document includes a plurality of document terms;
 designating a protocol for authenticating an assent to the document terms that is provided by the document recipient, wherein the protocol establishes an ocular recognition technology;
 providing, to the document recipient in response to a received request, instructions for processing an ocular image in accordance with the protocol;
 receiving, from the document recipient, the assent and a processed ocular image acquired from the document recipient in accordance with the protocol;
 comparing the processed ocular image with a reference ocular image stored in an authentication data repository; and
 in response to determining that the processed ocular image and the reference ocular image were derived from the document recipient, (a) updating status data associated with the document to indicate that the document recipient has assented to the document terms, and (b) adding a visual indicium to the document in response to determining that the processed ocular image and the reference ocular image were derived from the document recipient,
 wherein the visual indicium comprises a link to the status data and a graphical representation of the processed ocular image.

15. The computer program product of claim 14, wherein the process further comprises:
 receiving geolocation data that corresponds to a geographic location where the assent occurred; and
 providing the geolocation data to the document originator along with a notification indicating that the document recipient provided an authenticated assent.

16. The computer program product of claim 14, wherein the protocol establishes that at least one of an iris image and a retinal image should be acquired from the document recipient.

17. The computer program product of claim 14, wherein the received request is automatically generated as part of the workflow.

18. The computer program product of claim 14, wherein the processed ocular image comprises a one-way cryptographic hash that is encoded using a salt that is associated with the document recipient.

* * * * *